United States Patent
Currier et al.

(10) Patent No.: US 11,635,134 B1
(45) Date of Patent: Apr. 25, 2023

(54) PACKAGED OIL DELIVERY FOR SHORT TERM LUBRICATION

(71) Applicant: Zulu Pods, Inc., Davie, FL (US)

(72) Inventors: Todd M. Currier, Davie, FL (US); Robert Sladen, Davie, FL (US)

( * ) Notice: Subject to any disclaimer, the term of this patent is extended or adjusted under 35 U.S.C. 154(b) by 0 days.

(21) Appl. No.: 17/576,196

(22) Filed: Jan. 14, 2022

(51) Int. Cl.
*F16H 57/04* (2010.01)
*F02C 7/06* (2006.01)

(52) U.S. Cl.
CPC ..... *F16H 57/0442* (2013.01); *F16H 57/0435* (2013.01); *F16H 57/0471* (2013.01); *F02C 7/06* (2013.01)

(58) Field of Classification Search
CPC ............. F16H 57/0442; F16H 57/0435; F16H 57/0471; F01M 5/025
See application file for complete search history.

(56) References Cited

U.S. PATENT DOCUMENTS

| | | | |
|---|---|---|---|
| 3,422,807 A * | 1/1969 | Waldecker | F01M 5/00 222/335 |
| 3,513,943 A * | 5/1970 | Ernst | F16C 33/10 152/521 |
| 5,488,935 A * | 2/1996 | Berry, Jr. | F01M 5/025 184/6.3 |
| 6,148,789 A * | 11/2000 | Johns | F01M 5/025 123/196 R |
| 9,624,798 B2 * | 4/2017 | Mullen | B64C 27/14 |
| 9,903,364 B2 * | 2/2018 | Wallin | F04B 43/06 |
| 2007/0137934 A1 * | 6/2007 | Nappier | B23Q 11/1092 184/6.14 |
| 2009/0071754 A1 * | 3/2009 | McArthur | F16N 27/00 184/7.4 |
| 2009/0071755 A1 * | 3/2009 | Hsiao | F16N 7/02 184/55.1 |
| 2012/0207627 A1 * | 8/2012 | Demers | F04B 49/22 417/395 |
| 2016/0160857 A1 * | 6/2016 | Wallin | F04D 29/063 184/6.16 |

* cited by examiner

*Primary Examiner* — Michael A Riegelman
(74) *Attorney, Agent, or Firm* — Sanchelima & Associates, P.A.; Christian Sanchelima; Jesus Sanchelima

(57) ABSTRACT

A packaged delivery for short term lubrication including dispenser assembly, flow control assembly, pressure supply assembly and releasing mechanism assembly. Dispenser assembly includes a dispenser filled with oil. Dispensers can be placed within a shaft, a bearing house and a strut. Pressure supply assembly provides pressure to the oil stored in the dispenser. In one embodiment pressure supply is a mechanical pressure source. In an alternative embodiment, the pressure is a compressed gas. In one embodiment, the releasing mechanism assembly includes a thermal rupture mechanism. In another embodiment, the releasing mechanism assembly includes a mechanical rupture mechanism. Flow control assembly includes analog and digital controls to control flow rate of oil.

20 Claims, 9 Drawing Sheets

PACKAGED OIL DELIVERY FOR SHORT TERM LUBRICATION

BACKGROUND OF THE INVENTION

1. Field of the Invention

The present invention relates to packaged oil delivery for short term lubrication and, more particularly, to packaged oil delivery for short term lubrication that includes oil dispensers located within a shaft, a bearing housing support or a strut for lubrication.

2. Description of the Related Art

Several designs for packaged oil delivery for short term lubrication have been designed in the past. None of them, however, include a packaged oil delivery for short term lubrication that can be activated using temperature sensitive based opening mechanism or mechanical rupture mechanism.

Applicant believes that a related reference corresponds to U.S. Pat. No. 9,624,798B2 issued for a secondary lubrication system with an injectable additive. Applicant believes that another related reference corresponds to U.S. Pat. No. 3,513,943A issued for a porous packing material containing pressure and/or heat sensitive encapsulated lubricant. None of these references, however, teach of a package oil delivery system that includes oil dispensers having independent pressure supply.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a packaged oil delivery for short term lubrication that includes a mechanical pressure supply having a nonlinear spring to produce a constant force, avoiding the problem of pressure supply systems with sensitivity to directional accelerations.

It is another object of this invention to provide a packaged oil delivery for short term lubrication having a pressure supply that includes compressed gas to pre-pressurize the oil dispenser. The compressed gas helps to preserve the oil during storage and cools the oil during expansion.

It is still another object of the present invention to provide a package oil delivery for short term lubrication that includes a control flow mechanism having a temperature sensitive valve.

It is still another object of the present invention to provide a package oil delivery for short term lubrication that can be placed within a shaft, a bearing housing or a strut for emergency lubrication.

It is still another object of the present invention to provide a package oil delivery for short term lubrication that includes a mechanical pressure supply that is insensitive to directional accelerations.

It is still another object of the present invention to provide a package oil delivery for short term lubrication that includes a compressed gas supply that includes a compressed gas that provides pressure to the lubricant oil and also preserves and cools the lubricant oil during expansion.

It is still another object of the present invention to provide a package oil delivery for short term lubrication that includes a dispenser with the needed amount of oil for short duration lubrication to bearing and gears allowing turbomachinery to operate for short durations without a primary lubricant system It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
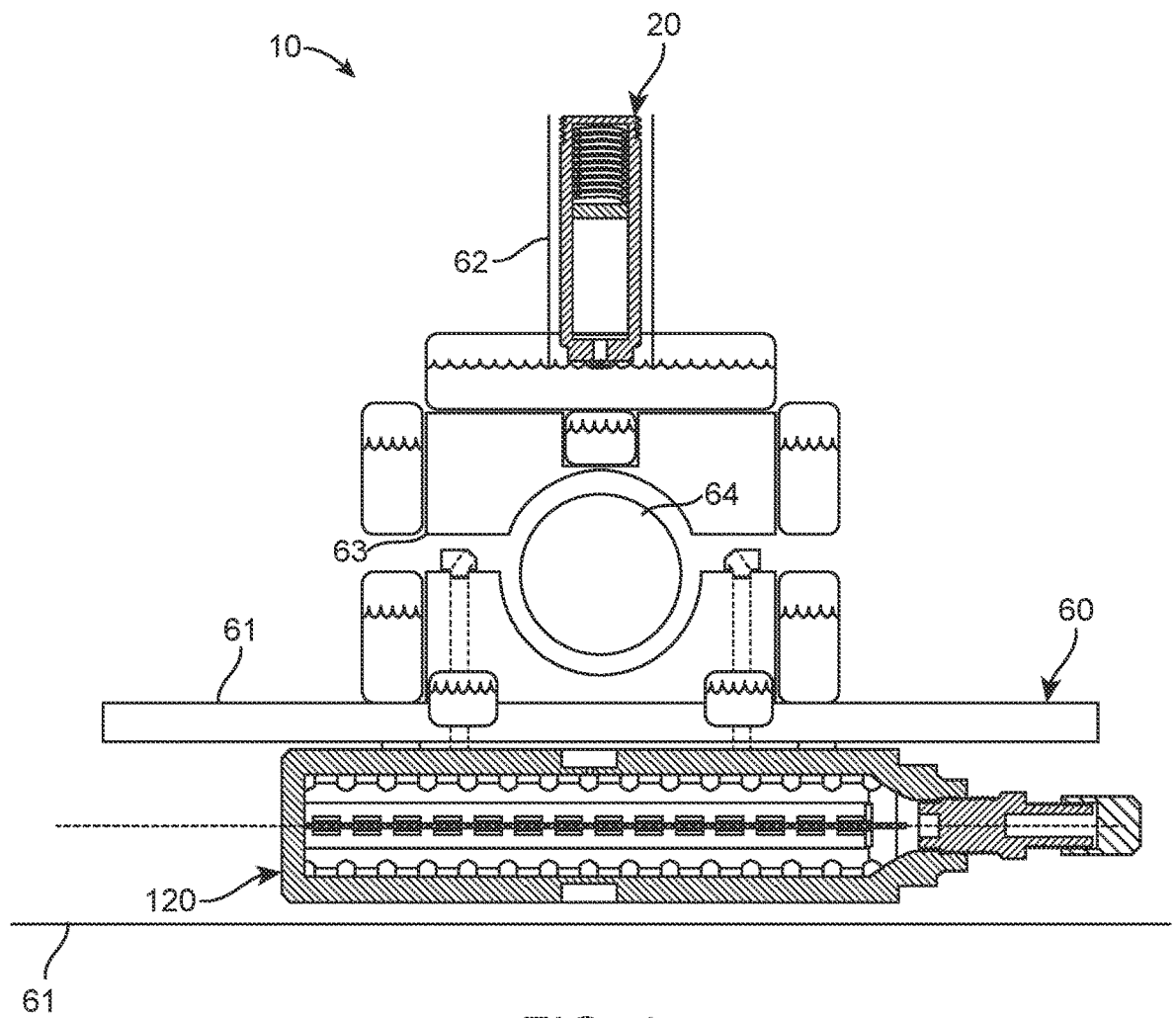
FIG. 1 represents a cross sectional operational view of the present invention 10 showing dispenser assembly 20 housed by strut 62 and centrifugal dispenser assembly 120 housed by shaft 61 to provide short lubrication to working zone assembly 60.

Referring now to the drawings, where the present invention is generally referred to with numeral 10, it can be observed that it basically includes dispenser assembly 20, pressure supply assembly 40 working zone assembly 60 control assembly 70. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Dispenser assembly 20 includes dispenser 26. In one embodiment, dispenser 26 may be an enclosure that serves as a housing of valve 23, reservoir 24 and pressure supply assembly 40. In a preferred embodiment, dispenser 26 may have a cylindrical shape. It also may be suitable to have dispenser 26 with other shapes such as cuboid shape, spherical shape, polygonal prism shape or any other suitable shape. Dispenser 26 may be made of an engineering material. Dispenser 26 may be made of a corrosion resistant material to resist severely corrosive environments. Dispenser 26 may be made of a heat resistant material. Dispenser 26 can be hollow with an internal surface defining reservoir 24. In a preferred embodiment, reservoir 24 may have cylindrical shape. It also may be suitable to have reservoir 24 with a spherical shape, a cuboid shape, an ovoid shape, a conic shape, a polygonal prism shape or any other suitable variation thereof. Reservoir 24 may contain lubricant oil for engine lubrication. Reservoir 24 may be designed to store the needed amount of oil for short duration lubrication to bearing and gears allowing turbomachinery to operate for short durations without a primary lubricant system.

Reservoir 24 may be filled with lubricant oil via valve 23. Valve 23 may be a two-way valve allowing to fill the reservoir 24 and to dispense the lubricant oil. In one embodiment, valve 23 may be placed on a lower distal end of the dispenser 26. Valve 23 connects reservoir 24 with the exterior of dispenser 26. It should be understood that valve 23 may be placed anywhere else on dispenser 26 connecting reservoir 24 with exterior of dispenser 26. Valve 23 may have an elongated cylindrical shape. Valve 23 may have any other suitable shape. Reservoir 24 may be filled by an external one-way valve such as a Schrader valve (not shown in the drawings).

Threaded portion 22 may facilitate installing of dispenser 26 on working zone assembly 60. In one embodiment, threaded portion 22 may be located on a top distal end of dispenser 26. It also may be suitable to have threaded portion 22 placed anywhere else on dispenser 26 depending on a desired installation of dispenser assembly 20. Preferably, threaded portion 22 may be a plug threaded portion. It also may be suitable to have the threaded portion 22 being a socket threaded portion. Threaded portion 22 of dispenser 26 may cooperate with a second threaded portion of working zone assembly 60 for removably installing dispenser 26 on working zone assembly 60. It should be understood that dispenser 26 may include any other suitable attaching method for removable mount dispenser 26 on working zone assembly 60. It also may be suitable to permanently mount dispenser 26 on working zone assembly 60 using welding or the like.

Figure 3:
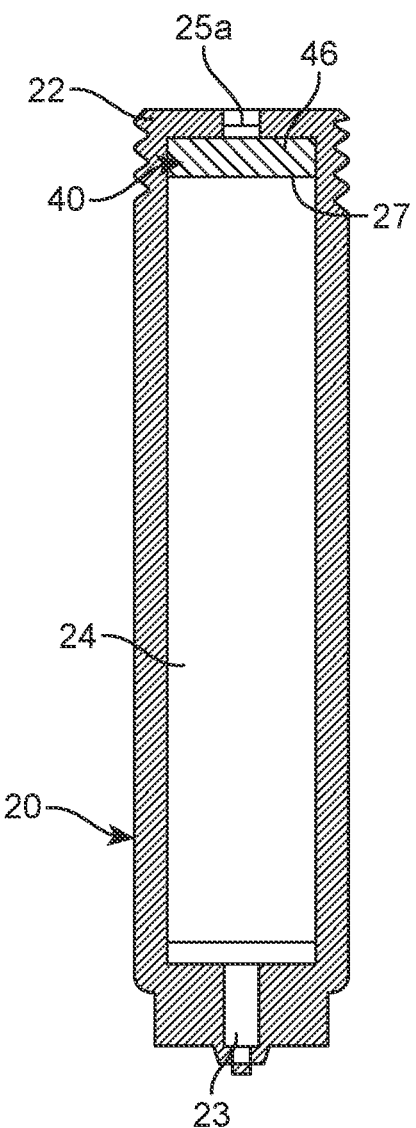
FIG. 3 illustrates a cross-sectional view of dispenser assembly 20 showing gas reservoir 27 being enclosed by pressurized gas housing 25.

Best observed in FIG. 3, an alternative embodiment of dispenser assembly 20 may include pressurized gas housing 25. In a preferred embodiment, pressurized gas housing 25 may have a cylindrical shape. It also may be suitable to have pressurized gas housing 25 with other shapes such as cuboid shape, spherical shape, polygonal prism shape or any other suitable shape. Pressurized gas housing 25 may be made of an engineering material. Pressurized gas housing 25 may be made of a corrosion resistant material to resist severely corrosive environments. Pressurized gas housing 25 is made of a heat resistant material. Pressurized gas housing 25 includes reservoir 24, gas reservoir 27 and inlet 25a. Preferably inlet 25a may be located on top distal end of pressurized gas housing 25 communicating gas reservoir 27 with exterior of pressurized gas housing 25. Gas reservoir 27 is located within the inlet 25a and the reservoir 25. Inlet 25a may allow to fill pressurized gas housing 25 with lubricant oil and with a compressed gas 46 of pressure supply assembly. Gas reservoir 27 may contain the compressed gas 46. Pressurized gas housing 25 may also include the threaded portion 22. Threaded portion 22 may be located on top distal end of pressurized gas 25. It also may be suitable to have threaded portion 22 located anywhere else on the external surface of pressurized gas housing 25 for installing pressurized gas housing 25 on working zone assembly 60. Pressurized gas housing 25 may also include valve 23. Valve 23 may be located on the lower distal end of pressurized gas housing 25 to communicate reservoir 24 with exterior of pressurized gas housing 25. Valve 23 may be located anywhere else on the pressurized gas housing 25.

Figure 4:
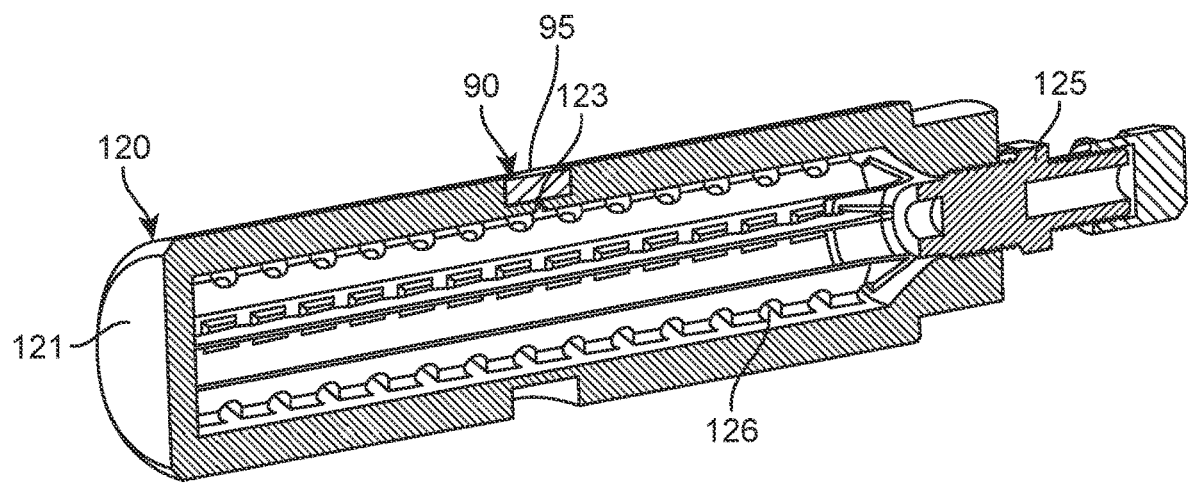
FIG. 4 is a representation of an isometric cross-sectional view of centrifugal dispenser assembly 120 showing the tanks 126 being in communication with centrifugal valve 123.

Referring now to FIG. 4, centrifugal dispenser assembly 120 assembly 120 includes centrifugal housing 121, fins 122, centrifugal valve 123, fin apertures 124, filling port 125 and tanks 126. The centrifugal dispenser 121 may have a cylindrical shape. The centrifugal dispenser 121 may be designed to be mounted within rotational mechanisms such as shown in FIG. 1, wherein the centrifugal dispenser is mounted within shaft 61. The rotation of rotation mechanisms may supply centrifugal forces within the centrifugal housing 121 providing centrifugal pressure to oil stored within the centrifugal housing 121. Centrifugal dispenser 121 may be made of an engineering material. Centrifugal dispenser 121 may be made of a corrosion resistant material to resist severely corrosive environments. Centrifugal dispenser 121 may be made of a heat resistant material. The fins 122 may be longitudinally mounted within the interior of the centrifugal dispenser 121 and around a perimeter of the dispenser 121. The fins 122 may be flattened rectangular members with fin apertures 124 located about a fin edge that is in abutting contact to the interior of the centrifugal dispenser 121. The fin apertures 124 may be a series of semi-circular shaped cuts. It should be understood that the fins apertures 124 may have any other shape. The fins 122 in conjunction with the fin apertures 124 may help in the acceleration of the fluid dynamic constraint to promote rigid body rotation of the fluid and maintain an irrotational flow. Filling port 125 may be located on a rear portion of the centrifugal dispenser 121 as best observed in FIG. 4. Filling port 125 may be a one-way valve. Filling port 125 may allow filling the tanks 126 with lubricant oil or with the compressed gas.

Figure 4A:
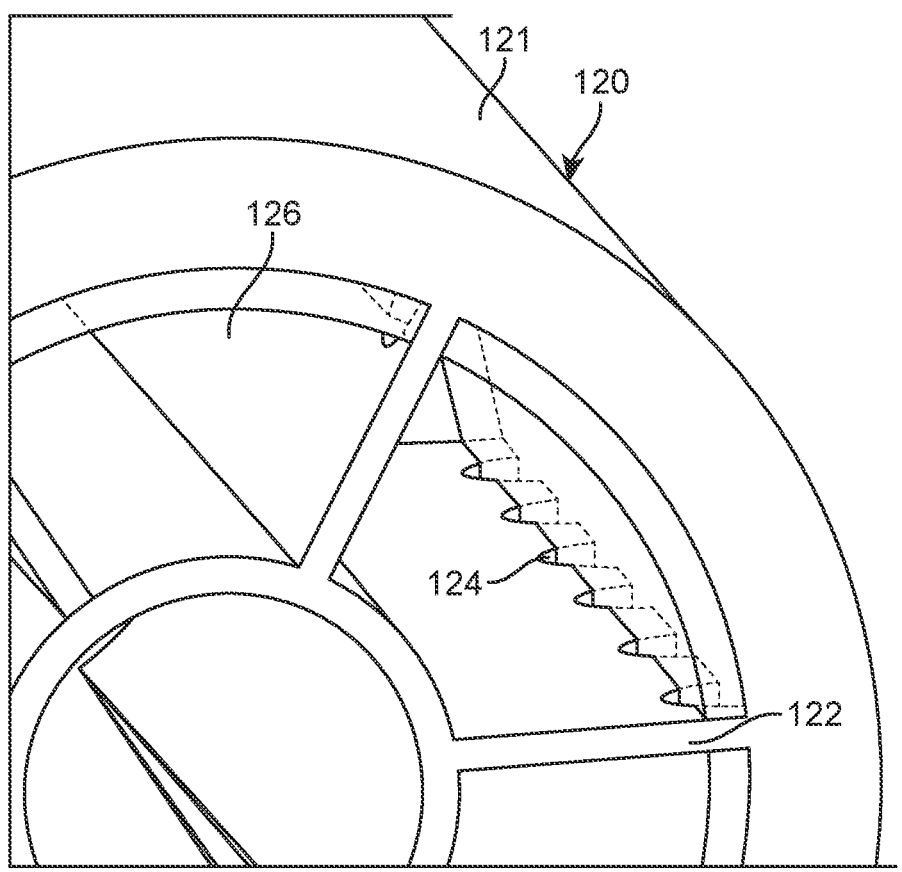
FIG. 4A is a front cross-sectional view of the centrifugal dispenser assembly 120 showing the tanks 126 being in communication one to each other via the fin apertures 124.
Figure 5:
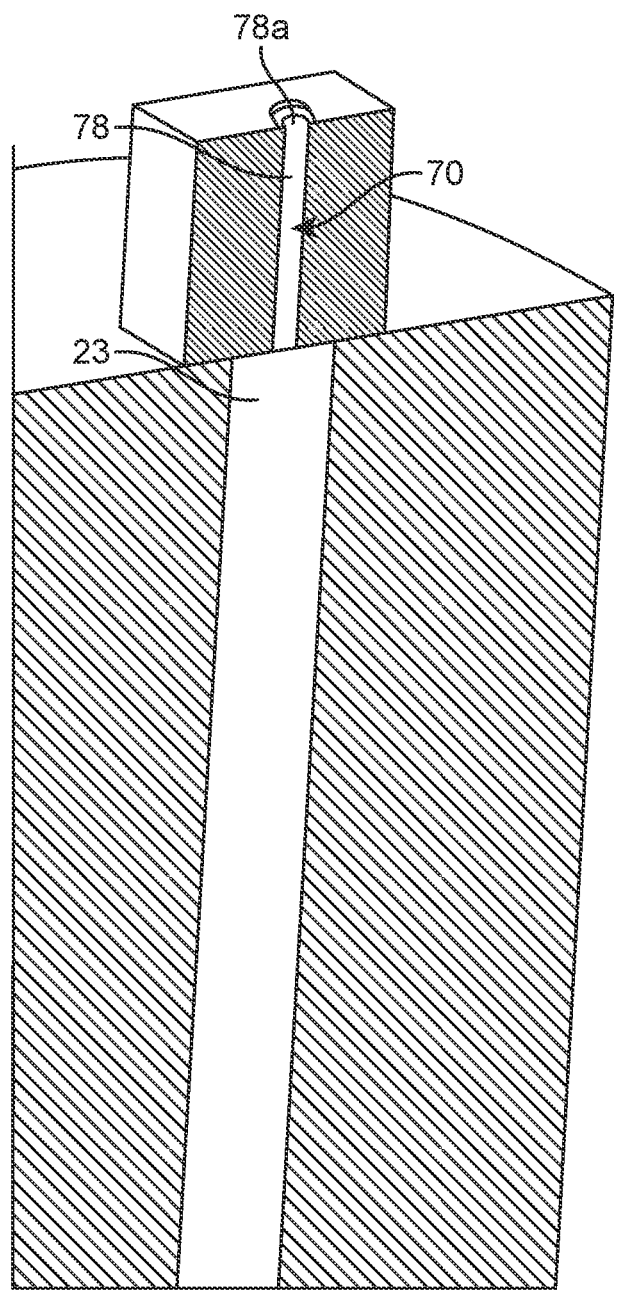
FIG. 5 is a detailed cross-sectional view of the passive valve 78 of control assembly 70 located at outlet of valve 23.
Figure 6:
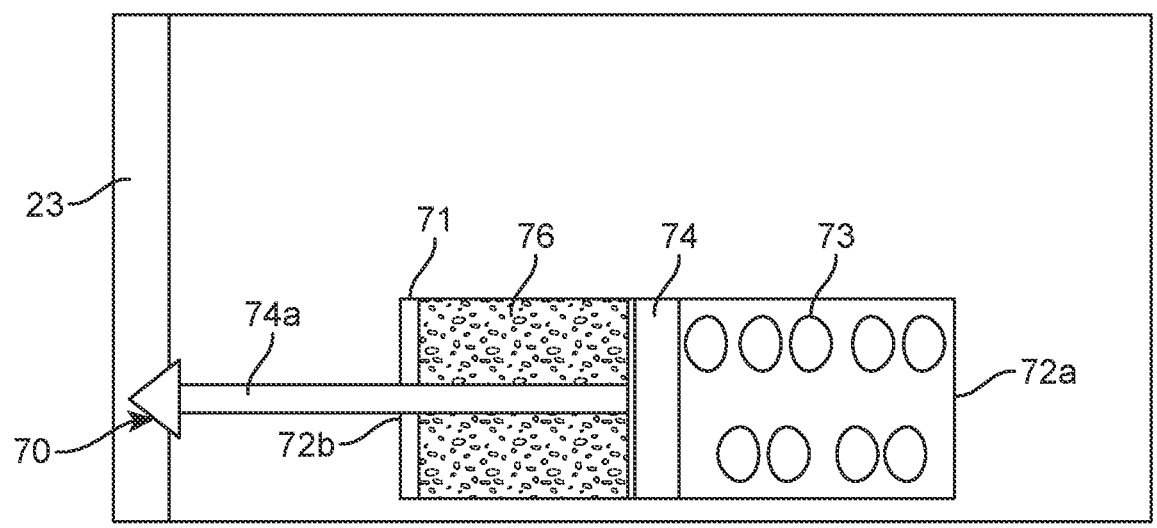
FIG. 6 is a detailed view of one of the preferred embodiments of the control assembly 70 showing active analog valve 71 driven by expansion and compression of control fluid 76.

As illustrated in FIG. 4A it may be suitable for the tanks 126 to be equally spaced and circumferentially disposed in plurality about an interior portion of the centrifugal dispenser 121. The perimeter of the tanks 126 may be defined by the fins 122 also disposed within the centrifugal dispenser 121. The fin apertures 124 located on the fins 122 may play an essential role in ensuring the redistribution of lubricant oil through tanks 126 located within the centrifugal dispenser 121. At high rotational speeds of the centrifugal dispenser 121 within shaft 61 the lubricant oil contained in the tanks 126 may lag the rotation of said centrifugal dispenser 121. When this occurs, the lubricant oil may be subjected to shearing forces. Thereby causing the lubricant oil to become unorganized under transient loading of the centrifugal dispenser 121. The fin apertures 124 may help prevent any one tank 126 from retaining more fluid or lubricant oil than any other tank 126. The redistribution of lubricant oil through the tanks 126 by the fins 122 and the fin apertures 124 has the added benefit of maintaining the centrifugal dispenser 121 properly balanced as the centrifugal housing 121 rotates. Thereby preventing vibrations that can cause damage to centrifugal housing 121 and working zone assembly 60. Centrifugal valve 123 may be located on one side of the centrifugal dispenser 121. Centrifugal valve 123 may allow communication between tanks 126 and exterior of the centrifugal dispenser 121 allowing lubricant oil to flow from tanks 126 to outside of centrifugal dispenser 121. Tanks 126 may be filled with a mixture of oil and nitrogen. Nitrogen may help to preserve the lubricant oil and pressurize the lubricant oil. Centrifugal dispenser assembly 120 is designed to utilize the centrifugal forces caused by rotation of shaft 61 to supply pressure to the lubricant oil stored inside the tanks 126.

Figure 2:
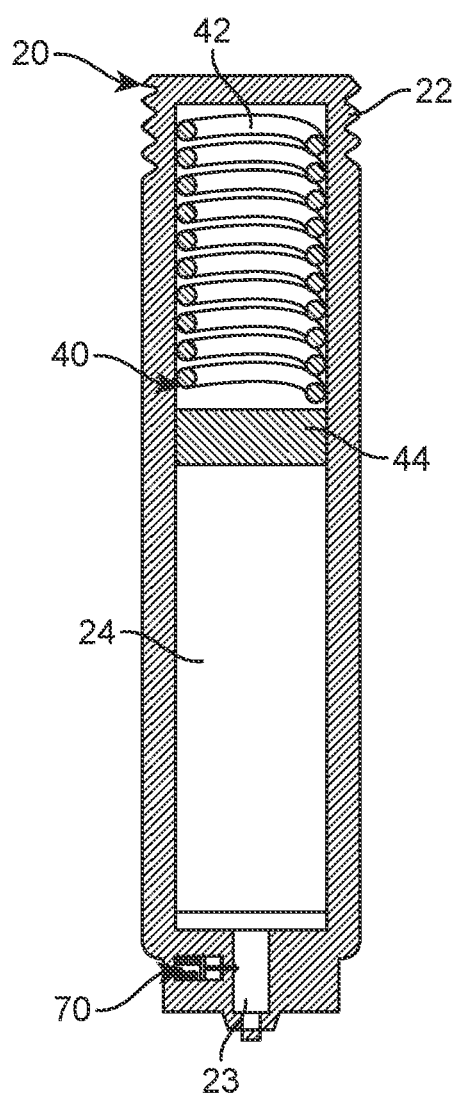
FIG. 2 shows a cross-sectional view of dispenser assembly 20 showing pressure supply assembly 40 enclosed within reservoir 24.

In one embodiment, pressure supply assembly 40 may include mechanical pressure supply including spring 42 and plunger 44. Best observed in FIG. 2, spring 42 may be located within reservoir 24. Upper end of spring 42 may be attached the upper distal end of reservoir 24. Spring 42 may be a nonlinear spring to produce a constant force and a constant pressure. A lower end of spring 42 may be attached to plunger 44. Plunger 44 may have a circular shape, a rectangular shape, or any other shape that fits into reservoir 24 sealing reservoir defining a lower reservoir 24a to receive lubricant oil. Spring 42 produces a constant pressure along reservoir 24. Spring 42 and plunger 44 produces a constant mechanical pressure to the lubricant oil contained into lower reservoir 24a. Mechanical pressure supply is insensitive to directional accelerations of working zone 60.

Referring now to FIG. 3, an alternative embodiment of the pressure supply assembly 40 includes compressed gas 46. Compressed gas 46 may provide cooling to the working zone 60. Compressed gas 46 may be a cooling gas. Preferably, compressed gas 46 may be a pressurized gas such as Nitrogen, oxygen, carbon dioxide, an inert gas, or any other gas that creates a pressure to lubricant oil contained into gas reservoir 27 of the pressurized gas housing 25. Compressed gas 46 may be provided to the interior of gas reservoir 27 via inlet 25a. Compressed gas 46 may be supplied from gas reservoir 27 to the reservoir 24 of pressurized gas housing 25 increasing the pressure of the lubricant oil contained inside the reservoir 24 of pressurized gas housing 25.

In one embodiment, control assembly 70 may include active analog valve 71. Active analog valve 71 may include control spring 73, control plunger 74, control fluid 76. Active analog valve 71 may have a cylindrical shape, cuboid shape, polygonal prism shape or any other suitable shape. Active analog valve 71 has an interior hollow defining a stroke chamber with a cylindrical shape, cuboid shape or the like. Active analog valve 71 has a closed end 72a and opened end 72b with an opening to receive a plunger shaft 74a of the control plunger 74. Control spring 73 may be placed into the stroke chamber with a first control spring end attached to the closed end 72a and a second control spring end attached to the plunger 74. Control spring 73 may be a linear spring or a nonlinear spring. The plunger 74 may movably divide the stroke chamber defining a fluid chamber. Fluid chamber may contain control fluid 76. In one embodiment, control fluid 76 may be a paraffin wax or any other suitable fluid or material that can expand its own volume by heating.

Active analog valve 71 may be placed on dispenser assembly 20 having plunger shaft 74a inserted into valve 23 to control flow of lubricant oil flowing through valve 23. Control spring 73 and control fluid 76 may be characterized to accurately control flow of lubricant oil flowing through valve 23. The active analog valve 71 controls flow of lubricant oil through valve 23 based on operating conditions.

At a first predetermined temperature the control spring 73 drives the control plunger 74 to close the valve 23. With an increment in temperature the control fluid 76 expands compressing the spring 73 and driving the control plunger 74 towards closed end 72a pulling valve 23 thereby allowing flow of lubricant oil through the valve 23. The control plunger 74 may increase or decrease flow of lubricant oil in function of temperature of operating conditions as the control fluid 76 is expanded or compressed. If temperature increases the active analog valve 71 allows more lubricant oil to flow through valve 23. It should be understood that active analog valve 71 may also be installed to the centrifugal dispenser assembly 20 with the plunger shaft 74a inserted into centrifugal valve 123 to control flow of the lubricant oil stored inside the tanks 126. As previously mentioned, oil stored in tanks 126 are under pressure due to the centrifugal forces of shaft 61. This pressure provides the force necessary to expel the oil out of centrifugal valve 123 upon control plunger 74 pulling centrifugal valve 123 open. Active analog valve 71 may be a proportional flow valve sensitive to temperature, a vacuum/pressure sensitive valve or the like.

In one alternative embodiment, the control assembly 70 may include passive valve 78. Flow control of lubricant oil through valve 23 may be achieved by passively controlling orifice 78a size of passive valve 78. Orifice 78a may have a circular shape, triangular shape, star shape, rectangular shape, polygonal shape, irregular shape or any other suitable shape. Orifice 78a may be located on any desired position on the surface of the passive valve 78. Passive valve 78 may be placed on the outlet of valve 23 or on the outlet of centrifugal valve 123. It also may be suitable to passively control flow of the lubricant oil through valve 23 by controlling pressure magnitudes of the pressure supply assembly 40. It should be understood that it also may be suitable for the passive valve 78 to include a restrictor. The restrictor may be in the form of multiple constrictions or a tortuous path in order to passively control the flow rate of lubricant oil. It also may be suitable to include any other means of passive flow control techniques to the passive valve as known in the prior art. It also may be appropriate to combine different passive control components and restrictors in conjunction with the passive valve 78. The passive control components may also be manufactured directly into the dispenser.

Figure 7:
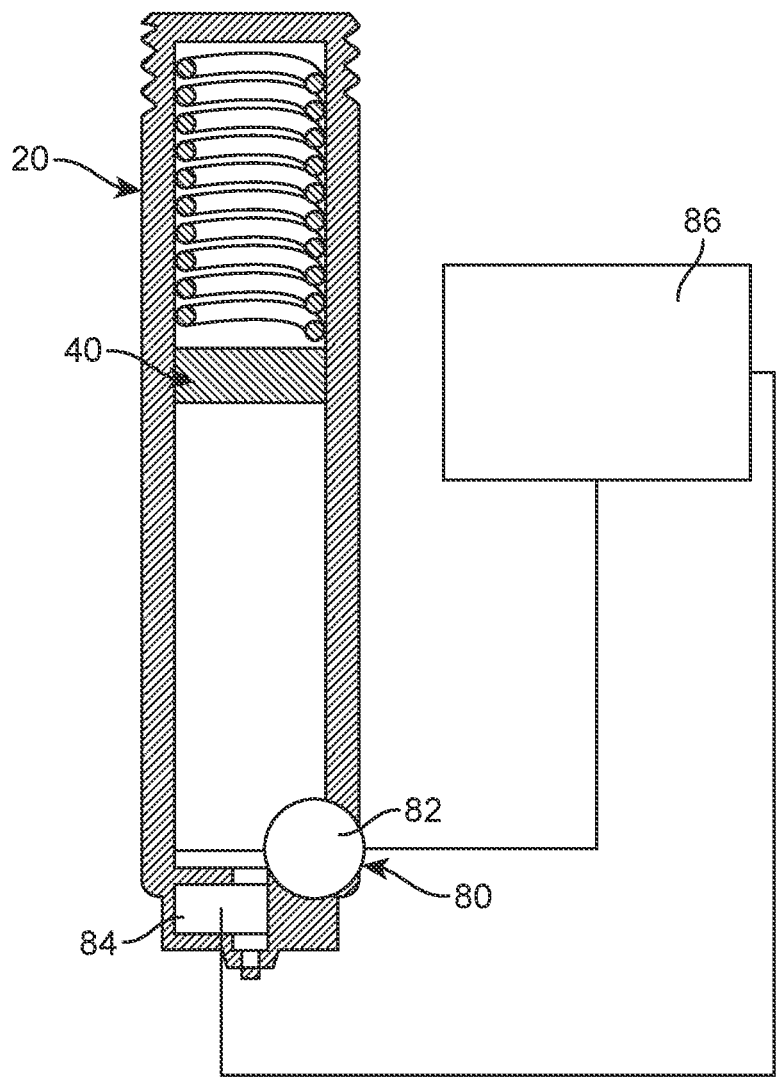
FIG. 7 is a representation of a cross sectional view of dispenser assembly 20 enclosing electronic assembly 80 including an electric valve 84 to control flow rate of lubricant oil.
Figure 8:
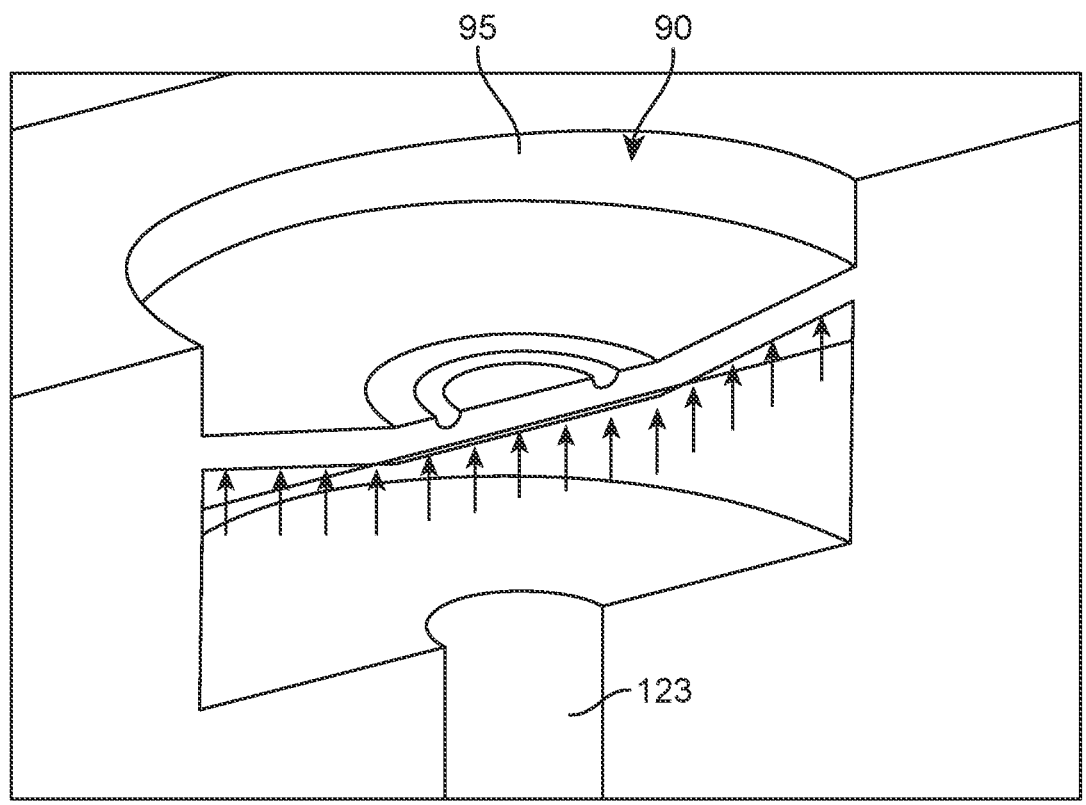
FIG. 8 is a detailed view of one embodiment of the releasing mechanism assembly 90 showing mechanical rupture mechanism 95 at outlet of centrifugal valve 123.
Figure 9:
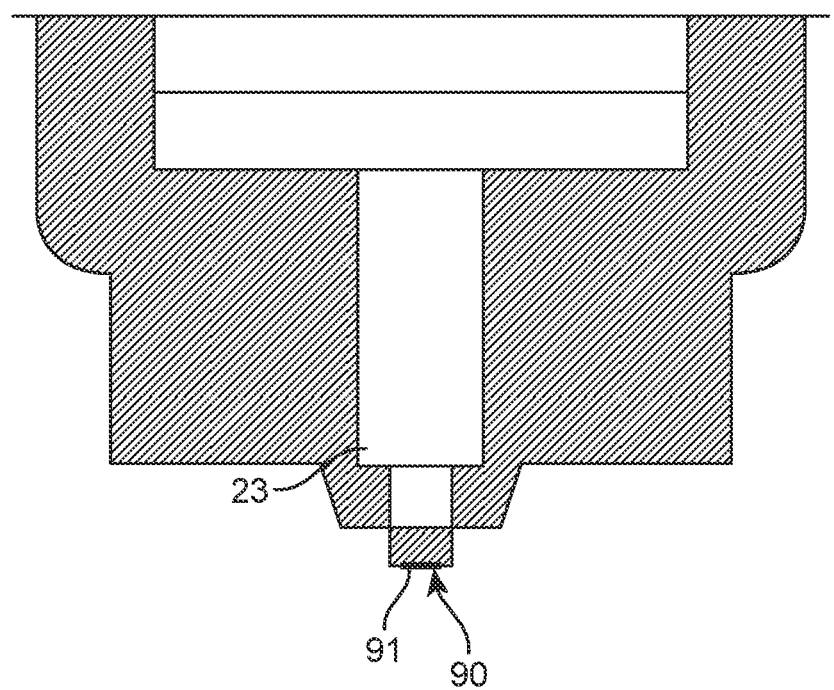
FIG. 9 is a detailed view of one of the preferred embodiments of releasing mechanism assembly 90 showing rupture temperature mechanism at outlet of valve 23.

Referring now to FIG. 7, electronic assembly 80 may be provided as an alternative to control assembly 70. Electronic assembly 80 may include a flow meter 82, electric valve 84 and microcontroller 86. Flow meter 82 may be located on dispenser assembly 20 to measure the flow rate of the lubricant oil flowing through the electric valve 84. Flow meter 82 may be an oval gear meter, a gear meter, a helical meter, a rotary piston, or any other suitable flow meter known in the prior art. Flow meter 82 may be a transducer that converts analog measurements to digital values. Microcontroller 86 may be a FPGA, an ARM, a PSoC™ or any other embedded system. Electric valve 84 may be electro-mechanically operated. Electric valve 84 may replace valve 23 at dispenser assembly 20. Electrical valve 84 may also replace centrifugal valve 123. Oil may be dispensed through the electrical valve 84. The electric valve 84 may control flow of the oil. Flow meter 82 may be wired to microcontroller 86. Electric valve 84 may be wired to microcontroller 86.

Microcontroller 86 may be programmed with a closed loop control or an opened loop control. At closed loop control the microcontroller 86 may be programmed to set a desired flow rate, if the flow rate measured by flow meter 82 is different than the desired flow rate the microcontroller 86 actuates the electric valve to regulate the flow rate to match with the desired flow rate. The desired flow rate may be set by operating conditions such as temperature. The microcontroller 86 may include temperature sensors to determine a desired flow rate of oil. The microcontroller 86 may implement a proportional controller, an integral controller, a proportional and integral controller, a proportional plus integral plus derivative controller, or any other suitable type of controller to control the flow rate of lubricant oil. At open loop control, the microcontroller 86 may be programmed to actuate the electric valve 84 to set desired flow rates without feedback provided by the flow meter 82. It should be understood that it also may be suitable to have an analogical controller circuit instead of microcontroller 86 for electronic assembly 80. The analogical controller circuit may be designed as a feedback controller wherein the feedback may be provided by the flow meter 82. It also may be suitable to have the feedback provided by a thermistor. It also may be suitable to have the thermistor as an input signal for the controller. The thermistor triggering a set point for the flow rate, in this configuration, the feedback may be provided by the flow meter 82 to regulate the flow rate in function of the thermistor. The analogical controller circuit may be designed as a proportional controller, an integral controller, a proportional and integral controller, a proportional plus integral plus derivative controller, or any other suitable type of controller to control the flow rate of lubricant oil. It should be understood that electronic assembly 80 may also be installed to the centrifugal dispenser assembly 120 to control flow of the lubricant oil stored inside the tanks 126 and pressurized by the centrifugal forces of shaft 61. The analogical controller may be designed using operational amplifiers, operational transconductance amplifiers, resistors, inductors, capacitors, and any other circuit suitable for designing an analog controller known in the prior art. The electronic assembly 80 may further include a power source. In one embodiment, the power source is a battery. It also may be suitable to have a wireless power supply as power source to provide energy to the electronic assembly 80 by electromagnetic induction. The electronic assembly 80 may further include an oil quality sensor. The oil quality sensor may be mounted within the reservoir 24 or along an exterior surface of the dispenser assembly 20. The oil quality sensor may measure the state of the oil or lubrication fluid being stored within the reservoir 24. The oil quality sensor may measure viscosity, density, dielectric constant, fluid temperature, or any other suitable physical variable to measure the quality of the oil In one embodiment, releasing mechanism assembly 90 may include a thermal rupture mechanism 91. Thermal rupture mechanism 91 may be a reactive membrane. Thermal rupture mechanism 91 may be provided at outlet of valve 23, electric valve 84 or passive valve 78 of dispenser assembly 20 or to centrifugal valve 123 of the centrifugal dispenser assembly 120. Thermal rupture mechanism 91 may be made of a material with a predetermined melting temperature based on desired operating conditions. Thermal rupture mechanism 91 may be melted at a predetermined temperature allowing lubricant oil to flow through the valve 23 or passive valve 78 of dispenser assembly 20 or through centrifugal valve 123 of the centrifugal dispenser assembly 120. It should be understood that releasing mechanism assembly 90 may include releasing mechanism that can be activated by vibrations, temperature, pressure or any other releasing mechanism known in the prior art. It also may be suitable to have an aleatory releasing mechanism.

In an alternative embodiment, releasing mechanism assembly 90 includes mechanical rupture mechanism 95. Mechanical rupture mechanism 95 may be provided as a disk such as frustum reverse buckling disk or any other mechanism that can be ruptured after a critical load caused by a pressure is applied. The rupture of the mechanical rupture mechanism 95 may also be driven by the variation of temperature, The mechanical rupture mechanism 95 may be provided at outlet of valve 23 or passive valve 78 of pressurized gas housing 25 or at outlet of centrifugal valve 123 of centrifugal dispenser assembly 123. At critical load and temperature applied to the mechanical rupture mechanism 95, the mechanical rupture mechanism 95 ruptures allowing lubricant oil to flow through the valve 23 or passive valve 78 of pressurized gas housing 25 or through centrifugal valve 123 of centrifugal dispenser assembly 123. It should be understood that releasing mechanism assembly 90 may also include non-rupturing releasing methods. It also may be suitable to have the releasing mechanism assembly 90 including a solenoid valve provided to valve 23, passive valve 78 or outlet centrifugal valve 123 to release the lubricant oil. The solenoid valve may be connected to the microcontroller 86 or to the thermistor. The microcontroller 86 may be programmed to activate the solenoid valve. The solenoid valve may be activated by the thermistor.

Referring now to FIG. 1, the working zone assembly 60 may include a shaft 61, a strut 62, a bearing housing 63 and a jet engine case (not shown in the drawings). The shaft 61 may be housed by bearing housings 63. The bearing housing 63 may enclose bearings 64. The strut 62 may connect the bearing housing 63 to the engine case. The strut 62 may include a threaded receiving portion (not shown in the drawings) to cooperate with the threaded portion 22 to mount the dispenser assembly 20 to the strut 62. The strut 62 may be fully accessible to install the dispenser assembly 20 to the strut 62. Dispenser assembly 20 may provide oil to the bearing housing 63 and bearings 64 connected to the strut 62. Dispenser assembly 20 may also be located in a bearing housing 63, in a gearbox or anywhere where short term lubrication is needed. The centrifugal dispenser assembly 120 may be housed by the shaft 61 to provide lubricant oil to working zone 60 including the bearing housing 63 and the bearings 64 when needed.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A packaged oil delivery for short term lubrication, comprising:
   A) a working zone assembly including a strut, a bearing housing and a shaft;
   B) a dispenser assembly including a dispenser, a reservoir and a valve, said dispenser is located in the strut to provide oil to said bearing housing, said reservoir is enclosed by the dispenser, said reservoir storing oil, said valve communicates reservoir with exterior of the dispenser to dispense said oil;
   C) a control assembly located at the valve of the dispenser assembly controlling a flow rate of the oil flowing through said valve; and
   D) a releasing mechanism assembly including a mechanical rupture mechanism, a thermal rupture mechanism and a non-rupture mechanism, wherein the mechanical rupture mechanism or the thermal rupture mechanism is located at an outlet of said valve.

2. The packaged oil delivery for short term lubrication set forth in claim 1 further including a pressure supply assembly to provide pressure to the oil stored in the reservoir.

3. The packaged oil delivery for short term lubrication set forth in claim 2, wherein said pressure supply assembly includes a spring and a plunger enclosed inside reservoir, a first end of the spring is attached to a top reservoir end, a second end of the spring is attached to the plunger, said spring produces a constant force along the reservoir to produce a pressure to the oil stored in said reservoir.

4. The packaged oil delivery for short term lubrication set forth in claim 2, wherein the dispenser includes an inlet and a gas reservoir, wherein said gas reservoir is located within the reservoir and the inlet, wherein the inlet allows to fill said gas reservoir with a compressed gas, wherein said compressed gas supplies pressure to the oil contained in the reservoir.

5. The packaged oil delivery for short term lubrication set forth in claim 1, wherein the control assembly includes an active analog valve to control the flow rate of the oil flowing through the valve, wherein the active analog valve is configured to be actuated based on operating conditions of the working zone assembly.

6. The packaged oil delivery for short term lubrication set forth in claim 5, wherein said active analog valve includes a control spring, a control plunger, and a control fluid, wherein said control spring pushes the control plunger to close the valve of the dispenser assembly, wherein the control fluid is configured to be expanded by temperature increments to push the control plunger opposite the valve to release said valve allowing the oil to flow through the valve.

7. The packaged oil delivery for short term lubrication set forth in claim 1, wherein the control assembly includes a passive valve to control the flow rate of the oil flowing through the valve, the passive valve includes an orifice of a predetermined size.

8. The packaged oil delivery for short term lubrication set forth in claim 1, wherein the control assembly includes an electric valve to control the flow rate of the oil.

9. The packaged oil delivery for short term lubrication set forth in claim 8, wherein said control assembly further includes a microcontroller and a flow meter, wherein said microcontroller is programmed with a digital controller with a feedback provided by said flow meter, said closed loop controller driving the electric valve to control the flow rate of said oil.

10. The packaged oil delivery for short term lubrication set forth in claim 8, wherein said electric valve is proportional flow valve.

11. The packaged oil delivery for short term lubrication set forth in claim 1, wherein the dispenser assembly further includes a threaded portion to removably attach the dispenser to the working zone assembly.

12. The packaged oil delivery for short term lubrication set forth in claim 1, wherein said dispenser is a centrifugal dispenser the valve is located on a lateral side of the centrifugal dispenser, wherein the centrifugal dispenser includes a plurality of fins longitudinally mounted within an interior of the centrifugal dispenser, wherein each fin of the plurality of fins has a plurality of fin apertures located about a fin edge that is in abutting contact to an interior of the centrifugal dispenser.

13. The packaged oil delivery for short term lubrication set forth in claim 12, wherein said centrifugal dispenser is mounted within the shaft, wherein the shaft is configured to provide centrifugal pressure to the oil stored within the centrifugal dispenser.

14. The packaged oil delivery for short term lubrication set forth in claim 12, wherein said plurality of fins define tanks, said tanks are equally spaced and circumferentially disposed on the interior of said centrifugal dispenser, said centrifugal dispenser further includes a filling port to fill said tanks with said oil.

15. The packaged oil delivery for short term lubrication set forth in claim 1, wherein said releasing mechanism assembly includes a solenoid valve to release said oil.

16. The packaged oil delivery for short term lubrication set forth in claim 1, wherein said mechanical rupture mechanism is a disk that is ruptured after a critical load is applied to said disk, wherein said thermal rupture mechanism is a reactive membrane made of a material with a desired predetermined melting temperature.

17. A packaged oil delivery for short term lubrication, comprising:
A) a working zone assembly including a strut, a bearing housing and a shaft;
B) a dispenser assembly including a dispenser, a reservoir and a valve, said dispenser is located in the strut to provide oil to said bearing housing, said reservoir is enclosed by the dispenser, said reservoir storing oil, said valve communicates reservoir with exterior of the dispenser to dispense said oil, wherein the dispenser includes an inlet and a gas reservoir, wherein said gas reservoir is located within the reservoir and the inlet, wherein the dispenser assembly further includes a threaded portion to removably attach the dispenser to the working zone assembly;
C) a control assembly located at the valve of the dispenser assembly controlling a flow rate of the oil flowing through said valve, wherein the control assembly includes an active analog valve to control the flow rate of the oil flowing through the valve, wherein the active analog valve is configured to be actuated based on operating conditions of the working zone assembly;
D) a releasing mechanism assembly including a mechanical rupture mechanism, a thermal rupture mechanism and a non-rupture mechanism, wherein the mechanical rupture mechanism or the thermal rupture mechanism is located at an outlet of said valve; and
E) a pressure supply assembly contained within said dispenser, wherein the pressure supply assembly increases pressure of the oil stored in the reservoir, wherein the pressure supply assembly includes a compressed gas to supply pressure to the oil contained in the reservoir, wherein the compressed gas is stored in said gas reservoir, said inlet allows to fill said gas reservoir with said compressed gas.

18. The packaged oil delivery for short term lubrication set forth in claim 17, wherein said active analog valve includes a control spring, a control plunger, and a control fluid, wherein said control spring pushes the control plunger to close the valve of the dispenser assembly, wherein the control fluid is configured to be expanded by temperature increments to push the control plunger opposite the valve to release said valve allowing the oil to flow through the valve.

19. A packaged oil delivery for short term lubrication, comprising:
A) a working zone assembly including a strut, a bearing housing and a shaft;
B) a dispenser assembly including a dispenser, a reservoir and a valve, said dispenser is located in the strut to provide oil to said bearing housing, said reservoir is enclosed by the dispenser, said reservoir storing oil, said valve communicates reservoir with exterior of the dispenser to dispense said oil, wherein the dispenser assembly further includes a threaded portion to removably attach the dispenser to the working zone assembly;

C) a control assembly located at the valve of the dispenser assembly controlling a flow rate of the oil flowing through said valve, wherein the control assembly includes a controller, a proportional flow valve, thermistor and a flow meter, wherein the thermistor sets a desired flow rate of said oil to the controller, wherein said flow meter provides a feedback to the controller, said controller driving said proportional flow valve to regulate the flow rate of said oil, wherein the controller is an analogical controller;

D) a releasing mechanism assembly including a solenoid valve, wherein said solenoid valve is located at an outlet of said solenoid valve is driven by said thermistor to release said oil; and E) a pressure supply assembly contained within said dispenser, wherein the pressure supply assembly increases pressure of the oil stored in the reservoir, wherein said pressure supply assembly includes a spring and a plunger enclosed inside reservoir, a first end of the spring is attached to a top reservoir end, a second end of the spring is attached to the plunger, said spring produces a constant force along the reservoir to produce a pressure to the oil stored in said reservoir.

20. The packaged oil delivery for short term lubrication set forth in claim 19, wherein said releasing mechanism assembly further includes a mechanical rupture mechanism, a thermal rupture mechanism and a non-rupture mechanism, wherein the mechanical rupture mechanism or the thermal rupture mechanism is located at outlet of said valve.

* * * * *